United States Patent
Kabashima

(10) Patent No.: US 10,634,026 B2
(45) Date of Patent: Apr. 28, 2020

(54) NOX STORAGE REDUCTION CATALYST

(71) Applicant: TOYOTA JIDOSHA KABUSHIKI KAISHA, Toyota-shi, Aichi-ken (JP)

(72) Inventor: Nobusuke Kabashima, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/427,361

(22) Filed: Feb. 8, 2017

(65) Prior Publication Data

US 2017/0226905 A1    Aug. 10, 2017

(30) Foreign Application Priority Data

Feb. 10, 2016   (JP) ................. 2016-024072

(51) Int. Cl.
*F01N 3/08*   (2006.01)
*F01N 3/10*   (2006.01)

(52) U.S. Cl.
CPC ......... *F01N 3/0814* (2013.01); *F01N 3/0842* (2013.01); *F01N 3/103* (2013.01); *F01N 2250/12* (2013.01); *F01N 2370/02* (2013.01); *F01N 2510/0682* (2013.01); *F01N 2510/0684* (2013.01); *Y02T 10/24* (2013.01)

(58) Field of Classification Search
CPC ...... F01N 3/0814; F01N 3/0842; F01N 3/103; F01N 2250/12; F01N 2510/0682; F01N 2510/0684; F01N 2370/02
USPC .......................................................... 60/301
See application file for complete search history.

(56) References Cited

U.S. PATENT DOCUMENTS

| | | | | |
|---|---|---|---|---|
| 6,499,294 B1 * | 12/2002 | Katoh | ............... | B01D 53/9431 502/304 |
| 2002/0103078 A1 * | 8/2002 | Hu | ..................... | B01D 53/8637 502/326 |
| 2005/0164879 A1 * | 7/2005 | Chen | .................. | B01D 53/9422 502/328 |
| 2010/0183490 A1 * | 7/2010 | Hoke | .................. | B01D 53/945 423/213.5 |

(Continued)

FOREIGN PATENT DOCUMENTS

| | | |
|---|---|---|
| JP | 2003-038936 A | 2/2003 |
| JP | 2009-285604 A | 12/2009 |

(Continued)

*Primary Examiner* — Patrick Hamo
*Assistant Examiner* — Kelsey L Stanek
(74) *Attorney, Agent, or Firm* — Hunton Andrews Kurth LLP

(57) ABSTRACT

An overall exhaust gas purification function based on an NOx reduction function and an HC oxidation function in an NSR catalyst arranged in an exhaust passage of an internal combustion engine is improved. In the NSR catalyst, a portion of an NOx storage catalyst layer supported by a carrier, which extends from its upstream end to an X % ($0 < X \leq 75$) of an overall length thereof along the flow of exhaust gas, forms an upstream side catalyst layer, and a portion of the NOx storage catalyst layer at the downward side of the upstream side catalyst layer along the flow of exhaust gas forms a downstream side catalyst layer. The upstream side catalyst layer does not contain potassium (K) as an NOx storage material, but the downstream side catalyst layer contains potassium (K) as an NOx storage material.

1 Claim, 6 Drawing Sheets

(56) References Cited

U.S. PATENT DOCUMENTS

2016/0199812 A1\* 7/2016 Aoki .................... B01J 37/0018
502/303

FOREIGN PATENT DOCUMENTS

| JP | 2010-017694 A | 1/2010 |
| JP | 2015-039667 A | 3/2015 |
| WO | 2009/144568 A1 | 12/2009 |

\* cited by examiner

NOX STORAGE REDUCTION CATALYST

This application claims the benefit of Japanese Patent Application No. 2016-024072, filed on Feb. 10, 2016, which is hereby incorporated by reference herein in its entirety.

TECHNICAL FIELD

The present invention relates to an NOx storage reduction catalyst that is arranged in an exhaust passage of an internal combustion engine.

BACKGROUND ART

In the past, as an exhaust gas purification catalyst arranged in an exhaust passage of an internal combustion engine, there has been known an NOx storage reduction catalyst (hereinafter, may be referred to as an "NSR catalyst") which has an NOx reduction function to store nitrogen oxides (NOx) in exhaust gas and to reduce the NOx thus stored. This NSR catalyst also has an HC oxidation function to oxidize hydrocarbon (HC) in the exhaust gas.

In patent literature 1, there is disclosed an NSR catalyst having a two-layer structure in which a catalyst coat layer supported by a carrier includes a lower layer formed on a carrier surface and an upper layer formed on a surface of the lower layer. In the NSR catalyst disclosed in this first patent literature, at least one of platinum (pt) and palladium (Pd) is supported or carried by at least the upper layer of the catalyst coat layer. In addition, in the catalyst coat layer, a larger amount of rhodium (Rh) is supported by the lower layer than by the upper layer.

CITATION LIST

Patent Literature

Patent Literature 1: Japanese patent laid-open publication No. 2009-285604

Patent Literature 2: Japanese patent laid-open publication No. 2015-039667

SUMMARY

Technical Problem

The present invention may improve an overall exhaust gas purification function based on an NOx reduction function and an HC oxidation function, in an NSR catalyst arranged in an exhaust passage of an internal combustion engine.

Solution to Problem

An NOx storage reduction catalyst according to the present invention is arranged in an exhaust passage of an internal combustion engine, and is provided with a carrier, and an NOx storage catalyst layer that is supported by said carrier, and is formed including a plurality of kinds of NOx storage materials, which are catalyst components having a function to store nitrogen oxides (NOx), and noble metals, wherein a portion of said NOx storage catalyst layer extending from its upstream end to an X % ($0<X\leq 75$) of the overall length of said NOx storage catalyst layer along the flow of exhaust gas forms an upstream side catalyst layer; a portion of said NOx storage catalyst layer at the downward side of said upstream side catalyst layer along the flow of exhaust gas forms a downstream side catalyst layer; and said upstream side catalyst layer may not contain potassium (K) as an NOx storage material, but said downstream side catalyst layer may contain potassium (K) as an NOx storage material.

In the NSR catalyst according to the present invention, the NOx storage catalyst layer formed including the NOx storage materials and noble metals is supported by the carrier. Note that in this description, the term "storage" is used in a broad sense, including "adsorption". Here, in the past, in the NSR catalyst, barium (Ba), lithium (Li), potassium (K), etc., are used as NOx storage materials. The NOx storage capacity of K in a high temperature region is very much high, among these NOx storage materials. For that reason, in the NOx storage catalyst layer, in the case where K is contained as an NOx storage material, the NOx reduction function at the time of high temperature in the NSR catalyst becomes high, in comparison with the case where K is not contained as an NOx storage material. On the other hand, it is known that in the NOx storage catalyst layer, in the case where K is not contained as an NOx storage material, the HC oxidation function in the NSR catalyst becomes high, in comparison with the case where K is contained as an NOx storage material. In other words, with respect to whether K is contained as an NOx storage material in the NOx storage catalyst layer, the NOx reduction function and the HC oxidation function in the NSR catalyst have a relation of trade-off.

Here, the inventor of the present invention has found out that the overall exhaust gas purification function of the NSR catalyst based on the NOx reduction function and the HC oxidation function, which are in the relation of trade-off as mentioned above, can be improved depending on the distribution of K in the NOx storage catalyst layer of the NSR catalyst. Specifically, a portion of the NOx storage catalyst layer, which extends from its upstream end to an X % ($0<X\leq 75$) of the overall length of the NOx storage catalyst layer along the flow of exhaust gas, forms the upstream side catalyst layer, and a portion of the NOx storage catalyst layer, which is at the downstream side of the upstream side catalyst layer along the flow of exhaust gas and extends over a (100−X) % ($0<X\leq 75$) portion of the overall length of the NOx storage catalyst layer, forms the downstream side catalyst layer. At this time, the inventor of the present invention has found out that by forming the NOx storage catalyst layer in such a manner that the upstream side catalyst layer does not contain K as an NOx storage material, but only the downstream side catalyst layer contains K as an NOx storage material, the overall exhaust gas purification function of the NSR catalyst based on the NOx reduction function and the HC oxidation function is improved, in comparison with the case where the NOx storage catalyst layer is formed in such a manner that K is distributed over an entire region of the NOx storage catalyst layer from its upstream end to its downstream end.

In the NSR catalyst according to the present invention, by making the distribution of K in the NOx storage catalyst layer be a suitable distribution newly found out as mentioned above, it is possible to improve the overall exhaust gas purification function of the NSR catalyst based on the NOx reduction function and the HC oxidation function to a further extent.

According to the present invention, it is possible to more improve an overall exhaust gas purification function based on an NOx reduction function and an HC oxidation function in an NSR catalyst arranged in an exhaust passage of an internal combustion engine.

DESCRIPTION OF EMBODIMENTS

Hereinafter, specific embodiments of the present invention will be described based on the attached drawings. However, the dimensions, materials, shapes, relative arrangements and so on of component parts described in examples are not intended to limit the technical scope of the present invention to these alone in particular as long as there are no specific statements.

Figure 1:
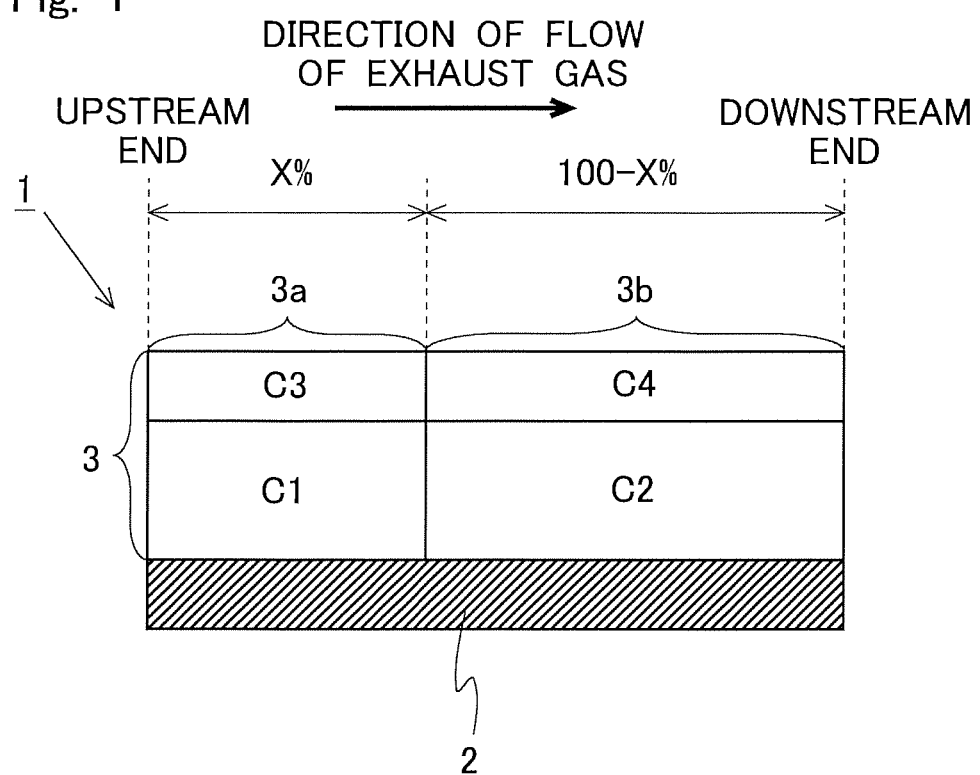
FIG. 1 is an image view showing the schematic construction of an NSR catalyst according to embodiments of the present invention.

FIG. 1 is an image view showing the schematic construction of an NSR catalyst according to an embodiment of the present invention. The NSR catalyst denoted by 1 in FIG. 1 is arranged as an exhaust gas purification catalyst in an exhaust passage of an internal combustion engine. In FIG. 1, an arrow indicates the direction of flow of exhaust gas at the time of the NSR catalyst 1 being arranged in the exhaust passage of the internal combustion engine.

The NSR catalyst 1 is constructed in such a manner that an NOx storage catalyst layer 3 is carried or supported by a carrier 2 which is formed of a porous material such as alumina ($Al_2O_3$), etc. The NOx storage catalyst layer 3 is formed including a plurality of kinds of noble metals and a plurality of kinds of NOx storage materials which are catalyst components having a function to store nitrogen oxides (NOx). Here, as the noble metals, there are used platinum (Pt), palladium (Pd), and rhodium (Rh). Of these noble metals, Pt and Pd mainly contribute to the oxidation of CO and HC, and Rh mainly contributes to the reduction of NOx. Here, note that both of Pt and Pd do not necessarily need to be included in the NOx storage catalyst layer 3, and a structure can also be adopted in which either of Pt and Pd is included. In addition, barium (Ba), lithium (Li), and potassium (K) are used as the NOx storage materials. Here, note that both of Ba and Li do not necessarily need to be included in the NOx storage catalyst layer 3, and a structure can also be adopted in which either of Ba and Li is included.

In addition, the NOx storage catalyst layer 3 has a laminated structure composed of lower layers C1, C2, which are in contact with the carrier 2, and upper layers C3, C4, which are formed on the lower layers C1, C2, respectively. In the lower layers C1, C2 of the NOx storage catalyst layer 3, Rh is contained, in addition to Pt and Pd, as noble metals. On the other hand, in the upper layers C3, C4 of the NOx storage catalyst layer 3, Rh is not contained although Pt and Pd are contained as noble metals. According to such a structure, the lower layers C1, C2 are higher in NOx reducing ability, as compared with the upper layers C3, C4, respectively.

Moreover, in the NOx storage catalyst layer 3, a portion thereof at the upstream side along the flow of exhaust gas forms an upstream side catalyst layer 3a, and a portion thereof at the downstream side forms a downstream side catalyst layer 3b. Here, the upstream side catalyst layer 3a is the portion (i.e., the lower layer C1 and the upper layer C3) of the NOx storage catalyst layer 3, which extends from its upstream end to an X % ($0<X\leq75$) of the overall length of the NOx storage catalyst layer 3 along the flow of exhaust gas. In addition, the downstream side catalyst layer 3b is the portion (i.e., the lower layer C2 and the upper layer C4) of the NOx storage catalyst layer 3, which is at the downstream side of the upstream side catalyst layer 3a along the flow of exhaust gas and is also a (100–X) % ($0<X\leq75$) portion of the overall length of the NOx storage catalyst layer 3. Then, the upstream side catalyst layer 3a does not contain potassium (K) as an NOx storage material, but the downstream side catalyst layer 3b alone contains potassium (K) as an NOx storage material. In other words, in the lower layer C1 and the upper layer C3, Ba and Li are contained as NOx storage materials, but K is not contained. On the other hand, Ba, Li and K are contained in the lower layer C2 and the upper layer C4 as NOx storage materials.

Hereinafter, reference will be made to methods of evaluation tests and results thereof with respect to the NSR catalyst 1 according to each example of the present invention and an NSR catalyst according to each comparative example.

<Methods for Producing Objects to be Evaluated>

First, reference will be made to a method for producing the NSR catalyst 1 according to each example of the present invention, which is an object to be tested for current evaluation. Here, note that the schematic construction of the NSR catalyst 1 according to each example of the present invention is as shown in the above-mentioned FIG. 1.

In order to obtain a lower layer slurry for forming the lower layers C1, C2 of the NOx storage catalyst layer 3, a catalyst powder (Pd—Pt powder) of 0.06 wt % Pd and 0.30 wt % Pt was produced by impregnating a palladium nitrate solution and a dinitrodiammine platinum solution into an $Al_2O_3$—$ZrO_2$—$TiO_2$ composite compound. In addition, a catalyst powder (Rh powder) of 1.00 wt % Rh was produced by impregnating a rhodium nitrate solution into an $Al_2O_3$—$ZrO_2$—$TiO_2$ composite compound. Then, the lower layer slurry was obtained by mixing the Pd—Pt powder of 120 g/L produced as mentioned above, the Rh powder of 30 g/L produced as mentioned above, a $CeO_2$—$ZrO_2$ composite oxide of 15 g/L, water, an $Al_2O_3$ binder, and a thickening agent, etc., in predetermined amounts, respectively.

In addition, in order to obtain an upper layer slurry for forming the upper layers C3, C4 of the NOx storage catalyst layer 3, a catalyst powder (Pd—Pt powder) of 0.36 wt % Pd and 1.80 wt % Pt was produced by impregnating a palladium nitrate solution and a dinitrodiammine platinum solution into an $Al_2O_3$—$ZrO_2$—$TiO_2$ composite compound. Then, the upper layer slurry was obtained by mixing the Pd—Pt powder of 60 g/L thus produced, a $CeO_2$—$ZrO_2$ composite oxide of 6 g/L, water, an $Al_2O_3$ binder, and a thickening agent, etc., in predetermined amounts, respectively.

Further, the lower layer slurry was divided into a slurry for the lower layer C1, and a slurry for the lower layer C2, and the upper layer slurry was divided into a slurry for the upper layer C3, and a slurry for the upper layer C4. Then, a predetermined amount of mixed solution including a predetermined concentration of barium acetate and a predetermined concentration of lithium acetate was added to the slurry for the lower layer C1 and the slurry for the upper layer C3. In addition, a predetermined amount of mixed solution including a predetermined concentration of barium acetate, a predetermined concentration of lithium acetate and a predetermined concentration of potassium acetate was added to the slurry for the lower layer C2 and the slurry for the upper layer C4.

Further, the slurry for the lower layer C1, the slurry for the lower layer C2, the slurry for the upper layer C3, and the slurry for the upper layer C4, produced as mentioned above, were coated on a monolithic carrier (substrate) of 2.0 L which becomes the carrier 2, by means of a drawing method. At this time, the upstream side catalyst layer 3a was formed by first coating the slurry for the lower layer C1 and then coating the slurry for the upper layer C3, on a portion in the monolithic carrier extending from its one end which becomes an upstream end in the exhaust gas to an X % of its overall length. In addition, the downstream side catalyst layer 3b was formed by first coating the slurry for the lower layer C2 and then coating the slurry for the upper layer C4, on a portion in the monolithic carrier which is at the downstream side of the upstream side catalyst layer 3a in the exhaust gas and which is also a (100−X) % portion of its overall length.

Individual contents of the various kinds of NOx storage materials per unit volume in each of the layers C1, C2, C3 and C4 in the NOx storage catalyst layer 3 of the NSR catalyst 1 according to each example of the present invention, which was the object to be tested for the current evaluation are as follows. Here, note that K is not contained in the lower layer C1 and the upper layer C3, as mentioned above.

The lower layer C1 and the upper layer C3 (i.e., the upstream side catalyst layer 3a):
Ba=0.2 mol/L, Li=0.1 mol/L
The lower layer C2 and the upper layer C4 (i.e., the downstream side catalyst layer 3b):
Ba=0.2 mol/L, Li=0.1 mol/L, K=0.15 mol/L Then, in the NSR catalyst 1 according to each example of the present invention, the values of the above-mentioned X for specifying the ratio of the range of the upstream side catalyst layer with respect to the overall length of the NOx storage catalyst layer are as follows, respectively.
(Example 1) X=12.5
(Example 2) X=25
(Example 3) X=50
(Example 4) X=75

Subsequently, reference will be made to an NSR catalyst according to each comparative example which was an object to be tested for current evaluation. Here, the construction of the NSR catalyst according to comparative example 1 is the same as the construction of the NSR catalyst 1 according to each example of the present invention shown in FIG. 1. However, the construction of the NSR catalyst according to comparative examples 2 through 4 is the same as the construction of the NSR catalyst 1 according to each example of the present invention shown in FIG. 1. The construction of the NSR catalyst according to the comparative examples 2 through 4 will be described later.

The NSR catalyst according to the comparative example 1 to be tested for the current evaluation was produced by a production method similar to that by which the NSR catalyst according to each of the above-mentioned examples of the present invention was produced. In addition, the contents of various kinds of NOx storage materials per unit volume in individual layers C1, C2, C3 and C4 in the NSR catalyst according to the comparative example 1 were made the same as the contents of the various kinds of NOx storage materials per unit volume in the individual layers C1, C2, C3 and C4 in the NSR catalyst according to each of the above-mentioned examples of the present invention. Then, in the NSR catalyst according to this comparative example 1, the value of the above-mentioned X for specifying the ratio of the range of an upstream side catalyst layer with respect to the overall length of an NOx storage catalyst layer is as follows.
(Comparative Example 1) X=87.5

Figure 2:
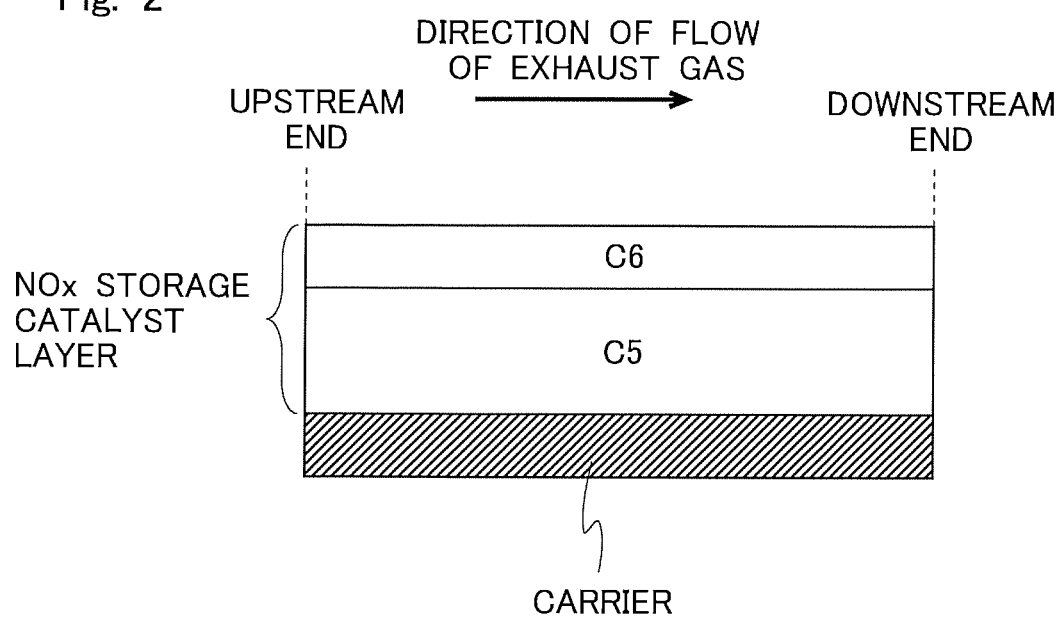
FIG. 2 is an image view showing the schematic construction of an NSR catalyst according to comparative examples.

Moreover, the schematic construction of the NSR catalyst according to each of the comparative examples 2 through 4 which were objects to be tested for current evaluation is as shown in FIG. 2. In FIG. 2, an arrow indicates the direction of flow of exhaust gas at the time of the NSR catalyst being arranged in an exhaust passage of an internal combustion engine.

The NSR catalyst according to each of the comparative examples 2 through 4 is constructed in such a manner that the NOx storage catalyst layer is supported by a carrier which is formed by the same material as the carrier 2 of the NSR catalyst 1 according to the above-mentioned embodiment of the present invention. In addition, this NOx storage catalyst layer is also formed including a plurality of kinds of noble metals and a plurality of kinds of NOx storage materials. Moreover, this NOx storage catalyst layer also has a laminated structure composed of a lower layer C5, which is in contact with the carrier, and an upper layer C6, which is formed on the lower layer C5. However, the NOx storage catalyst layer of the NSR catalyst according to each of the comparative examples 2 through 4, being different from the NOx storage catalyst layer 3 of the NSR catalyst 1 according to the above-mentioned embodiment of the present invention, includes various kinds of NOx storage materials distributed substantially uniformly from its upstream end to its downstream end in each of the lower layer C5 and the upper layer C6 (in other words, the NOx storage catalyst layer is not divided into an upstream side catalyst layer and a downstream side catalyst layer).

In the lower layer C5 in the NOx storage catalyst layer of the NSR catalyst according to each of the comparative examples 2 through 4, there are contained Pt, Pd and Rh as noble metals, similar to the lower layers C1, C2 in the NOx storage catalyst layer 3 of the NSR catalyst 1 according to the embodiment of the present invention. Moreover, in the upper layer C6 in the NOx storage catalyst layer of the NSR catalyst according to each of the comparative examples 2 through 4, there are contained Pt and Pd as noble metals, but there are not contained K, similar to the upper layers C3, C4 in the NOx storage catalyst layer 3 of the NSR catalyst 1 according to the embodiment of the present invention. Then, Ba, Li and K are contained as NOx storage materials in the lower layer C5 and the upper layer C6 in the NOx storage catalyst layer of the NSR catalyst according to each of the comparative examples 2, 3, from its upstream end to its downstream end. In other words, the construction of the NSR catalyst according to each of the comparative examples 2, 3 corresponds to a construction thereof in the case where the value of the above-mentioned X for specifying the ratio of the range of the upstream side catalyst layer with respect to the overall length of the NOx storage catalyst layer is zero. On the other hand, in the lower layer C5 and the upper layer C6 in the NOx storage catalyst layer of the NSR catalyst according to the comparative example 4, Ba and Li are contained as NOx storage materials, but K is not contained, from their upstream end to their downstream end.

In other words, the construction of the NSR catalyst according to the comparative example 4 corresponds to a construction thereof in the case where the value of the above-mentioned X for specifying the ratio of the range of the upstream side catalyst layer with respect to the overall length of the NOx storage catalyst layer is 100.

Next, reference will be made to a method for producing the NSR catalyst according to each of the comparative examples 2 through 4 which were objects to be tested for current evaluation. A lower layer slurry for forming the lower layer C5 of the NOx storage catalyst layer in the NSR catalyst according to each of the comparative examples 2, 3 was produced by the same method as the above-mentioned method for producing the lower layer slurry for forming the lower layer C2 of the NOx storage catalyst layer 3 of the NSR catalyst 1 according to the embodiment of the present invention. In addition, an upper layer slurry for forming the upper layer C6 of the NOx storage catalyst layer in the NSR catalyst according to each of the comparative examples 2, 3 was produced by the same method as the above-mentioned method for producing the upper layer slurry for forming the upper layer C4 of the NOx storage catalyst layer 3 of the NSR catalyst 1 according to the embodiment of the present invention. In other words, a predetermined amount of mixed solution including a predetermined concentration of barium acetate, a predetermined concentration of lithium acetate and a predetermined concentration of potassium acetate was added to the lower layer slurry for forming the lower layer C5 and the upper layer slurry for forming the upper layer C6 according to each of the comparative examples 2, 3.

On the other hand, a lower layer slurry for forming the lower layer C5 of the NOx storage catalyst layer in the NSR catalyst according to the comparative example 4 was produced by the same method as the above-mentioned method for producing the lower layer slurry for forming the lower layer C1 of the NOx storage catalyst layer 3 of the NSR catalyst 1 according to the embodiment of the present invention. In addition, an upper layer slurry for forming the upper layer C6 of the NOx storage catalyst layer in the NSR catalyst according to the comparative example 4 was produced by the same method as the above-mentioned method for producing the upper layer slurry for forming the upper layer C3 of the NOx storage catalyst layer 3 of the NSR catalyst 1 according to the embodiment of the present invention. In other words, a predetermined amount of mixed solution including a predetermined concentration of barium acetate and a predetermined concentration of lithium acetate was added to the lower layer slurry for forming the lower layer C5 and the upper layer slurry for forming the upper layer C6 according to the comparative example 4.

Then, the slurry for the lower layer C5 and the slurry for the upper layer C6, produced as mentioned above, were coated on a monolithic carrier (substrate) of 2.0 L which becomes a carrier, by means of a drawing method. At this time, the NOx storage catalyst layer was formed by first coating the slurry for the lower layer C5 and then coating the slurry for the upper layer C6, on the monolithic carrier from its one end to its other end in a uniform manner.

Individual contents of the various kinds of NOx storage materials per unit volume in each of the layers C5 and C6 in the NOx storage catalyst layer of the NSR catalyst according to each of the comparative examples 2 through 4 which were the objects to be tested for the current evaluation are as follows. Here, note that K is not contained in the individual layers C5, C6 of the NOx storage catalyst layer of the NSR catalyst according to comparative example 4, as mentioned above.

(Comparative Example 2) Ba=0.2 mol/L, Li=0.1 mol/L, K=0.150 mol/L
(Comparative Example 3) Ba=0.2 mol/L, Li=0.1 mol/L, K=0.75 mol/L
(Comparative Example 4) Ba=0.2 mol/L, Li=0.1 mol/L The contents of K in the NOx storage catalyst layer 3 of the NSR catalyst 1 according to each example of the present invention and in the NOx storage catalyst layer of the NSR catalyst according to each comparative example, which were the objects to be tested for current evaluation and which were produced as mentioned above, areas shown in the following Table 1, respectively. Here, note that in the following Table 1, the content of K in the NOx storage catalyst layer of each NSR catalyst is represented by a ratio in the case of assuming that the content of K in the NOx storage catalyst layer of the NSR catalyst according to the comparative example 2 is 100%.

TABLE 1

|  | EXAMPLE 1 | EXAMPLE 2 | EXAMPLE 3 | EXAMPLE 4 |
| --- | --- | --- | --- | --- |
| CONTENT OF K | 87.5% | 75% | 50% | 25% |
| X | 12.5 | 25 | 50 | 75 |
|  | COMPARATIVE EXAMPLE 1 | COMPARATIVE EXAMPLE 2 | COMPARATIVE EXAMPLE 3 | COMPARATIVE EXAMPLE 4 |
| CONTENT OF K | 12.5% | 100% | 50% | 0% |
| X | 87.5 | 0 | 0 | 100 |

<Endurance Test>

In order to evaluate the function of each NSR catalyst in a state approximate to the state of being placed in an actual operating condition in an exhaust passage of an internal combustion engine, instead of a new state, an endurance test was carried out before carrying out an evaluation test with respect to the NSR catalyst according to each example and each comparative example to be evaluated. In this endurance test, each NSR catalyst as an object to be evaluated is arranged in an exhaust passage of an internal combustion engine for testing, and the catalyst temperature thereof is maintained at 750 degrees C. for 50 hours. In addition, the air fuel ratio of exhaust gas, becoming a reference air fuel ratio, was set to a lean air fuel ratio, and rich spike control was carried out in a periodic manner in which the air fuel ratio of exhaust gas was adjusted to a rich air fuel ratio for a predetermined period of time.

<Evaluation Test>

In the current evaluation test, each NSR catalyst (i.e., the NSR catalyst after the above-mentioned endurance test was carried out) as an object to be evaluated is arranged in the exhaust passage of the internal combustion engine for testing, and the catalyst temperature thereof was maintained at 450 degrees C., the air fuel ratio of exhaust gas, becoming a reference air fuel ratio, was set to a lean air fuel ratio, and rich spike control was carried out in a periodic manner in which the air fuel ratio of exhaust gas was adjusted to a rich air fuel ratio for a predetermined period of time. Then, when the air fuel ratio of the exhaust gas was a lean air fuel ratio and after the amount of NOx discharge was stabilized, the NOx reduction ratio (i.e., the ratio of the amount of NOx to be reduced in the NOx catalyst with respect to the amount of NOx flowing into the NOx catalyst) and the HC oxidation ratio (i.e., the ratio of the amount of HC to be oxidized in the NOx catalyst with respect to the amount of HC flowing into the NOx catalyst) per combustion cycle were calculated as evaluation indexes.

<Evaluation Results>

Figure 3:
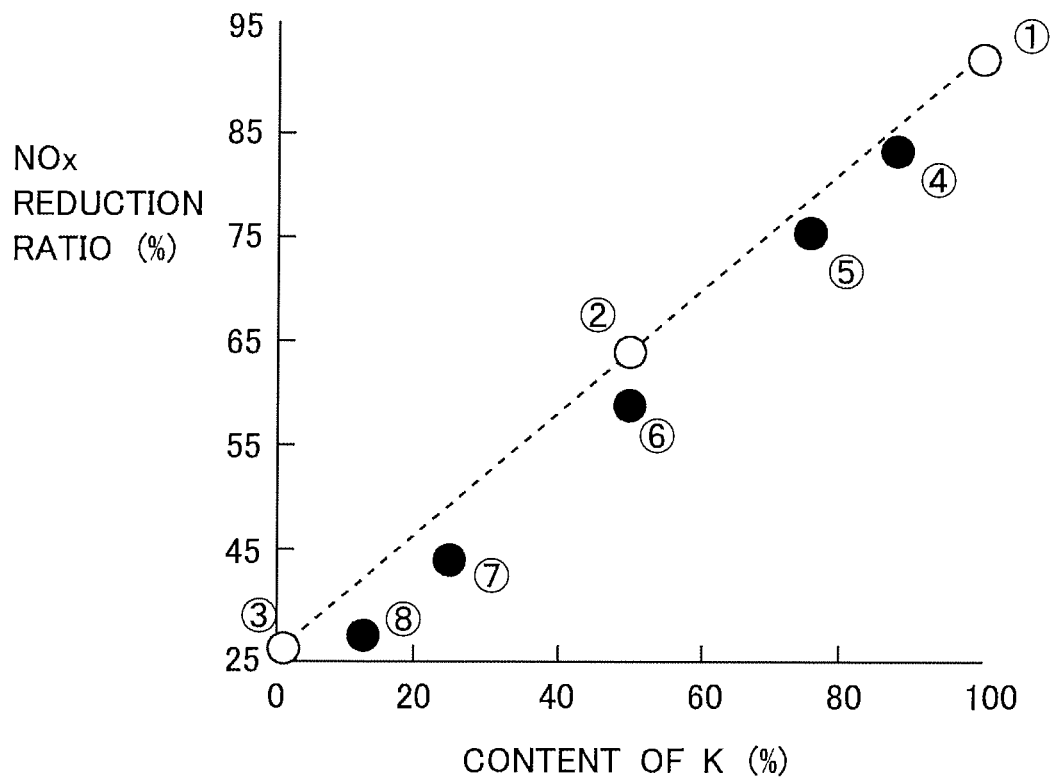
FIG. 3 is a view showing the relation between the concentration of K in an NOx storage catalyst layer and the NOx reduction ratio, of each NSR catalyst which is an object to be evaluated.

First, reference will be made to the results of the current evaluation tests based on FIG. 3 through FIG. 5. FIG. 3 is a view showing the relation between the concentration of K in the NOx storage catalyst layer and the NOx reduction ratio, of each NSR catalyst which is an object to be evaluated. In FIG. 3, the axis of abscissa represents the content of K in the NOx storage catalyst layer. Note that, here, similar to the above mentioned Table 1, the content of K in the NOx storage catalyst layer of each NSR catalyst is represented by a ratio in the case of assuming that the content of K in the NOx storage catalyst layer of the NSR catalyst according to the comparative example 2 is 100%. In addition, in FIG. 3, the axis of ordinate represents the NOx reduction ratio.

Figure 4:
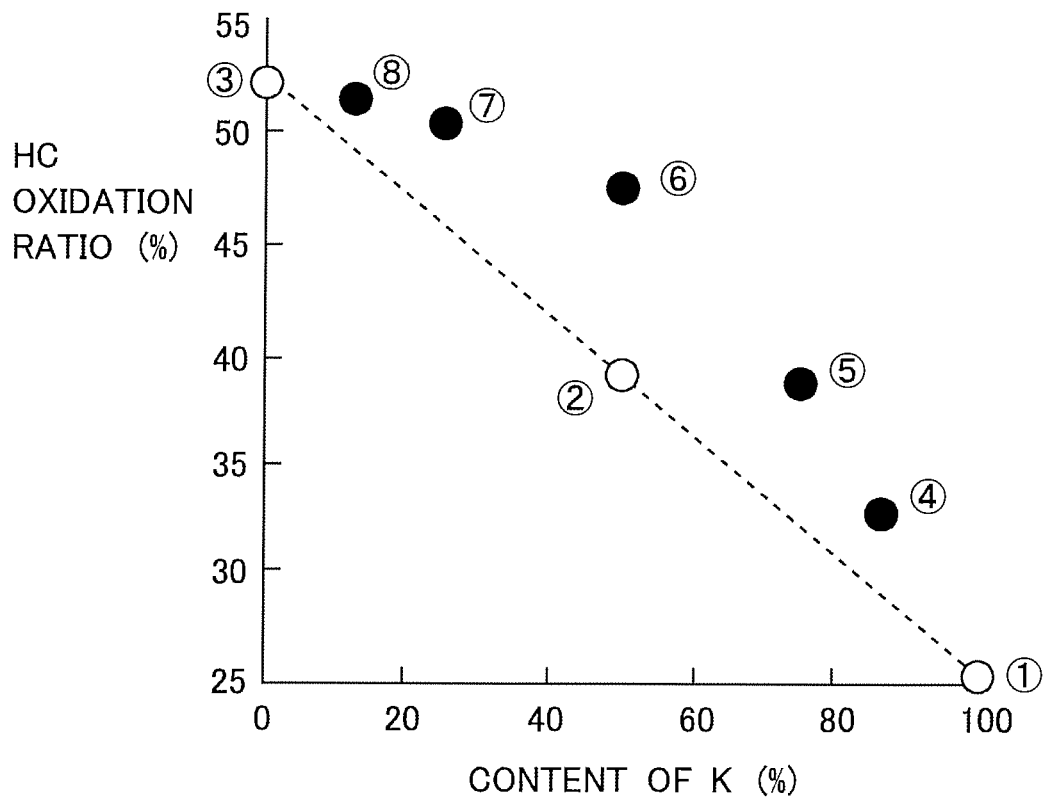
FIG. 4 is a view showing the relation between the concentration of K in an NOx storage catalyst layer and the HC oxidation ratio, of each NSR catalyst which is an object to be evaluated.

FIG. 4 is a view showing the relation between the concentration of K in the NOx storage catalyst layer and the HC oxidation ratio, of each NSR catalyst which is an object to be evaluated. In FIG. 4, the axis of abscissa represents the content of K in the NOx storage catalyst layer. Note that, here, similar to the above mentioned Table 1 and FIG. 3, the content of K in the NOx storage catalyst layer of each NSR catalyst is represented by a ratio in the case of assuming that the content of K in the NOx storage catalyst layer of the NSR catalyst according to the comparative example 2 is 100%. In addition, in FIG. 4, the axis of ordinate represents the HC oxidation ratio.

Figure 5:
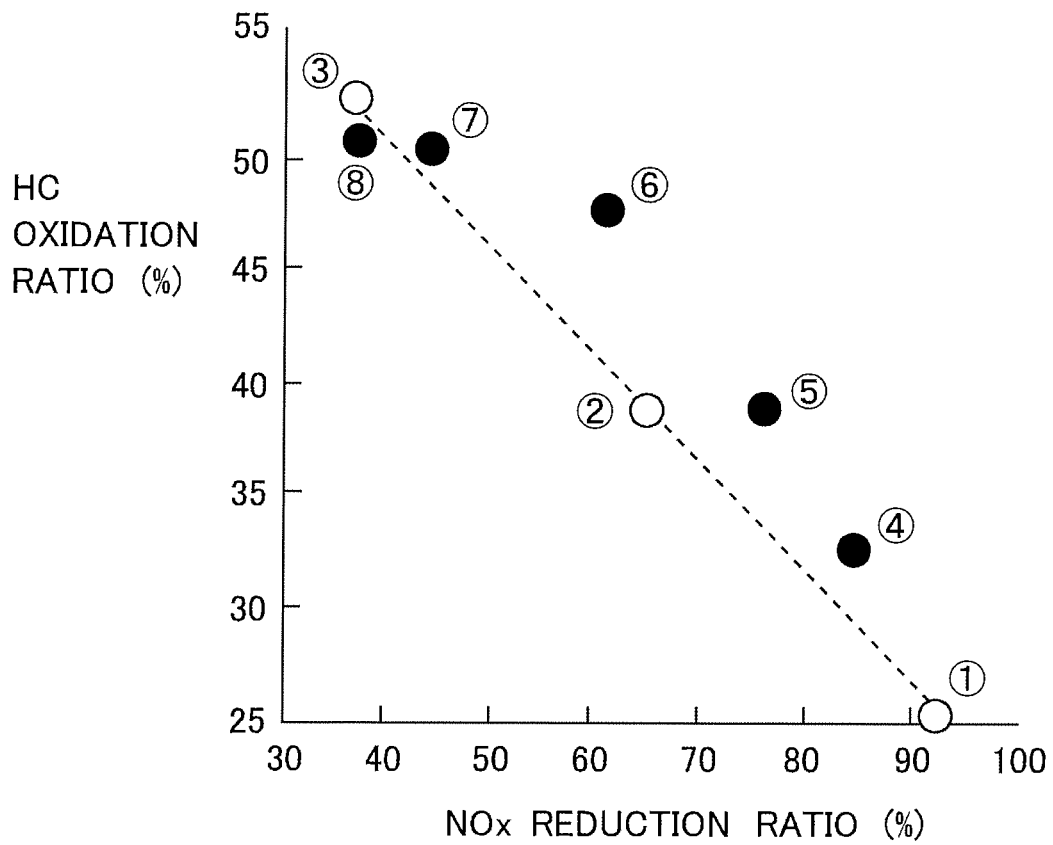
FIG. 5 is a view showing the relation between the NOx reduction ratio of each NSR catalyst shown in FIG. 3 and the HC oxidation ratio of each NSR catalyst shown in FIG. 4.

FIG. 5 is a view showing the relation between the NOx reduction ratio of each NSR catalyst shown in FIG. 3 and the HC oxidation ratio of each NSR catalyst shown in FIG. 4. In other words, FIG. 5 shows a balance between the NOx reduction ratio and the HC oxidation ratio of each NSR catalyst which is an object to be evaluated. In FIG. 5, the axis of abscissa represents the NOx reduction ratio, and the axis of ordinate represents the HC oxidation ratio. In addition, in FIGS. 3 through 5, white circles 1 through 3 indicate the evaluation results of the NSR catalysts according to the comparative examples 2 through 4, respectively, whereas black circles 4 through 7 indicate the evaluation results of the NSR catalysts according to the examples 1 through 4, respectively, and a black circle 8 indicates the evaluation result of the NSR catalyst according to the comparative example 1.

In FIG. 3, a broken line shows the relation between the content of K in the NOx storage catalyst layer and the NOx reduction ratio estimated based on the evaluation results of the NSR catalysts according to the comparative examples 2 through 4 indicated by the white circles 1 through 3, in the case where the NOx storage catalyst layer is formed so that K is distributed over the entire region of the NOx storage catalyst layer from its upstream end to its downstream end. Hereinafter, NOx reduction ratios on the broken line in this FIG. 3 may be referred to as "reference NOx reduction ratios". From this FIG. 3, it can be seen that if the content of K in the NOx storage catalyst layer is made the same, the NOx reduction ratios in the case where in the NOx storage catalyst layer, K is not contained in the upstream side catalyst layer but only in the downstream side catalyst layer (i.e., the NOx reduction ratios indicated by the individual black circles in FIG. 3) are lower in comparison with NOx reduction ratios in the case where K is distributed over the entire region of the NOx storage catalyst layer from its upstream end to its downstream end (i.e., the reference NOx reduction ratios in FIG. 3). Then, in FIG. 3, an amount of decrease in each NOx reduction ratio with respect to each corresponding reference NOx reduction ratio (i.e., a difference between the broken line and each black circle in the vertical (ordinate) axis direction of FIG. 3) becomes larger in order of the black circle 4, the black circle 5, the black circle 6, the black circle 7, and the black circle 8. In other words, the larger the value of X specifying the ranges of the upstream side catalyst layer and the downstream side catalyst layer in the NOx storage catalyst layer (i.e., the larger the range of the upstream side catalyst layer), the larger becomes the amount of decrease in the NOx reduction ratio with respect to the reference NOx reduction ratio. This is presumed to be because in each NSR catalyst, the NOx in the exhaust gas is generally more easily stored in the upstream side portion thereof, in comparison with the downstream side portion thereof, and hence, the larger the range of the upstream side catalyst layer in which K is not contained, the larger becomes an amount of decrease in the storage amount of NOx with respect to an amount of decrease in the content of K.

In addition, in FIG. 4, a broken line shows the relation between the content of K and the HC oxidation ratio in the NOx storage catalyst layer, which is estimated based on the evaluation results of the NSR catalysts according to the comparative examples 2 through 4 indicated by white circles 1 through 3, in the case where the NOx storage catalyst layer is formed so that K is distributed over the entire region of the NOx storage catalyst layer from its upstream end to its downstream end. Hereinafter, HC oxidation ratios on the broken line in this FIG. 4 maybe referred to as "reference HC oxidation ratios". From this FIG. 4, it can be seen that if the content of K in the NOx storage catalyst layer is made the same, the HC oxidation ratios in the case where in the NOx storage catalyst layer, K is not contained in the upstream side catalyst layer but only in the downstream side catalyst layer (i.e., the HC oxidation ratios indicated by the individual black circles in FIG. 4) are higher in comparison with the HC oxidation ratios in the case where K is distributed over the entire region of the NOx storage catalyst layer from its upstream end to its downstream end (i.e., the reference HC oxidation ratios in FIG. 4). However, an amount of increase in the HC oxidation ratio indicated by the black circle 8 with respect to the reference HC oxidation ratio is smaller than an amount of increase in the HC oxidation ratio indicated by each of black circles 4 through 7 with respect to the reference HC oxidation ratio (i.e., a difference between the broken line and each of the black circles 4 through 7 in the ordinate (vertical) axis direction of FIG. 4). This is presumed to be because in the NOx storage catalyst layer, HC in the exhaust gas is easily oxidized in the upstream side catalyst layer in which K is not contained as an NOx storage material, and hence, when the value of X specifying the ranges of the upstream side catalyst layer and the downstream side catalyst layer becomes large (i.e., the range of the upstream side catalyst layer becomes large), the HC oxidation ratio goes up to a certain extent, but if the upstream side catalyst layer spreads to a certain range, a sufficient place of HC oxidation will be ensured (in other words, the HC oxidation ratio will be saturated with respect to the increase in the range of the upstream side catalyst layer).

Then, in FIG. 5, a broken line represents the correlation between the NOx reduction ratio and the HC oxidation ratio corresponding to each content of K in the NOx storage catalyst layer, i.e., the correlation between the reference NOx reduction ratio shown in FIG. 3 and the reference HC oxidation ratio shown in FIG. 4, in the case where the NOx storage catalyst layer is formed so that K is distributed over the entire region of the NOx storage catalyst layer from its upstream end to its downstream end. In other words, in the case where the NOx storage catalyst layer is formed so that K is distributed over the entire region of the NOx storage catalyst layer from its upstream end to its downstream end, the broken line shown in this FIG. 5 becomes a line of trade-off for the NOx reduction ratio and the HC oxidation ratio. Hereinafter, the broken line shown in this FIG. 5 may be referred to as a "reference trade-off line". Then, from this FIG. 5, it can be seen that the black circles 4 through 7 indicating the evaluation results of the NSR catalysts according to the examples 1 through 4 are more improved in the numerical values of the NOx reduction ratios and the HC oxidation ratios, than the reference trade-off line. In other words, from this FIG. 5, it can be seen that according to the NSR catalysts according to the examples 1 through 4, the HC oxidation ratio corresponding to the same NOx reduction ratio becomes higher, and the NOx reduction ratio corresponding to the same HC oxidation ratio becomes higher, in comparison with an NSR catalyst in which an NOx storage catalyst layer is formed so that K is distributed over the entire region of the NOx storage catalyst layer from its upstream end to its downstream end. On the other hand, from this FIG. 5, it can be seen that the black circle 8 indicating the evaluation result of the NSR catalyst according to the comparative example 1 is lower in the numerical values of the NOx reduction ratio and the HC oxidation ratio, than the reference trade-off line. In other words, from this FIG. 5, it can be seen that according to the NSR catalyst according to the comparative example 1, the HC oxidation ratio corresponding to the same NOx reduction ratio becomes lower, and the NOx reduction ratio corresponding to the same HC oxidation ratio becomes lower, in comparison with the NSR catalyst in which the NOx storage catalyst layer is formed so that K is distributed over the entire region of the NOx storage catalyst layer from its upstream end to its downstream end.

According to the results of evaluation as mentioned above, it can be seen that when in the NOx storage catalyst layer 3 of the NSR catalyst 1, the upstream side catalyst layer 3a in which K is not contained as an NOx storage material is formed of a portion of the NOx storage catalyst layer 3 which extends from its upstream end to an X % of the overall length thereof, and the downstream side catalyst layer 3b in which K is contained as an NOx storage material is formed of a portion of the NOx storage catalyst layer 3 which is at the downstream side of the upstream side catalyst layer 3a and which extends over a (100–X) % of the overall length thereof, and if the value of X is in a range of 0<X≤75 (i.e., within a range in which the examples 1 through 4 of the present invention fall), the overall exhaust gas purification function of the NSR catalyst 1 based on the NOx reduction function and the HC oxidation function is improved, in comparison with the case where the NOx storage catalyst layer is formed in such a manner that K is distributed over the entire region of the NOx storage catalyst layer from its upstream end to its downstream end. On the other hand, it can be seen that when the value of the above-mentioned X becomes larger than 75, even if the NOx storage catalyst layer 3 is divided into the upstream side catalyst layer 3a and the downstream side catalyst layer 3b, the overall exhaust gas purification function of the NSR catalyst 1 based on the NOx reduction function and the HC oxidation function is contrarily lowered, in comparison with the case where the NOx storage catalyst layer is formed in such a manner that K is distributed over the entire region of the NOx storage catalyst layer from its upstream end to its downstream end. This is presumed to be due to the influence of both of the correlation between the range of the upstream side catalyst layer in the NOx storage catalyst layer, and the amount of decrease in the NOx reduction ratio with respect to the reference NOx reduction ratio, and the correlation between the range of the upstream side catalyst layer in the NOx storage catalyst layer and the amount of increase in the HC oxidation ratio with respect to the reference HC oxidation ratio, as mentioned above.

As described above, according to the NSR catalyst 1 according to this embodiment constructed as shown in FIG. 1, it is possible to improve the overall exhaust gas purification function of the NSR catalyst 1 based on the NOx reduction function and the HC oxidation function to a further extent. In addition, in the NOx storage catalyst layer 3 of the NSR catalyst 1, by forming the portion thereof not containing K as an NOx storage material into the upstream side catalyst layer 3a, and the portion thereof containing K as an NOx storage material into the downstream side catalyst layer 3b, it is possible to maintain the state where K is not contained in the upstream side catalyst layer, even if K transpires in the NOx storage catalyst layer 3 and moves to the downstream side by the flow of the exhaust gas. For that reason, it is possible to maintain the state where the overall exhaust gas purification function of the NSR catalyst 1 based on the NOx reduction function and the HC oxidation function is improved to a further extent. This is also clear from the above-mentioned evaluation results which were obtained by the evaluation tests carried out after the endurance tests performed with respect to the individual NSR catalysts used as the objects to be evaluated.

<Modifications>

Figure 6:
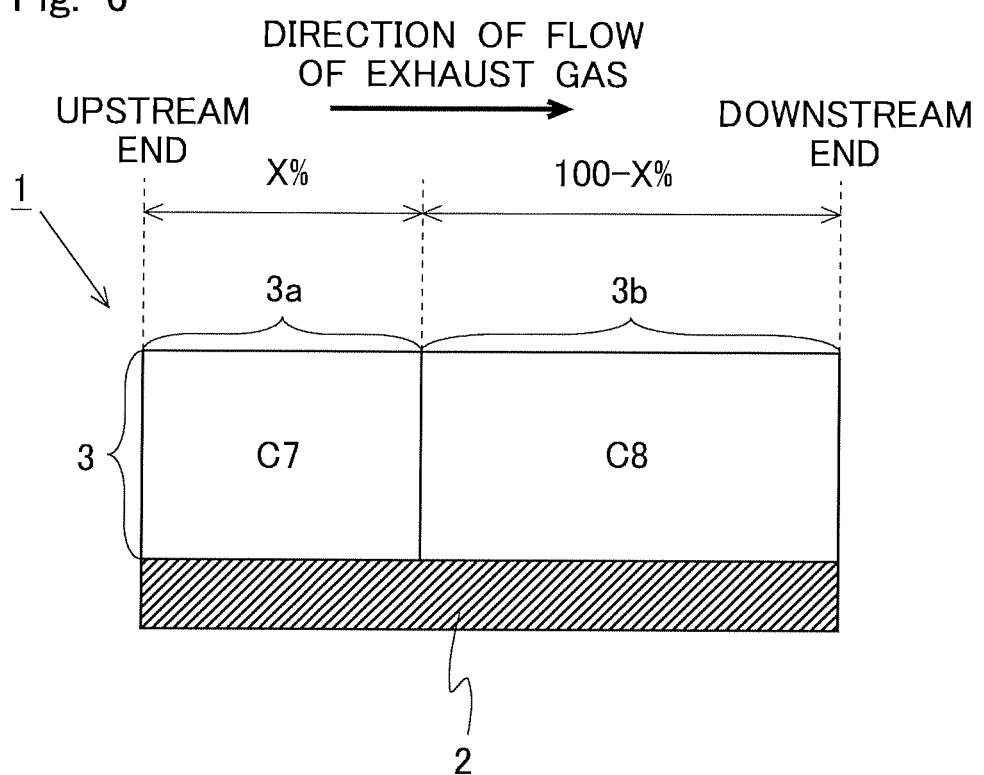
FIG. 6 is an image view showing the schematic construction of an NSR catalyst according to a modification of the embodiments of the present invention.

In the NSR catalyst 1 shown in FIG. 1, the laminated structure formed by the lower layers C1, C2 and the upper layers C3, C4 is adopted as the structure of the NOx storage catalyst layer 3. However, the NOx storage catalyst layer 3 in the NSR catalyst 1 does not necessarily have such a laminated structure. FIG. 6 is an image view showing the schematic construction of an NSR catalyst according to a modification of the embodiment of the present invention. In this FIG. 6, too, an arrow indicates the direction of flow of exhaust gas at the time of the NSR catalyst 1 being arranged in an exhaust passage of an internal combustion engine.

Similar to the construction shown in FIG. 1, an NOx storage catalyst layer 3 shown in FIG. 6 is formed of an upstream side catalyst layer 3a and a downstream side catalyst layer 3b. Then, the areas of the ranges of the upstream side catalyst layer 3a and the downstream side catalyst layer 3b are similarly specified as the construction shown in FIG. 1 (in other words, 0<X≤75 is satisfied). However, unlike the construction shown in FIG. 1, in the construction shown in FIG. 6, the upstream side catalyst layer 3a and the downstream side catalyst layer 3b are each formed only by one layer, respectively. Here, a layer C7, which forms the upstream side catalyst layer 3a, is composed of the same noble metal and NOx storage material as those of the lower layer C1 in the upstream side catalyst layer 3a shown in FIG. 1. Also, a layer C8, which forms the downstream side catalyst layer 3b, is composed of the same noble metal and NOx storage material as those of the lower layer C2 in the downstream side catalyst layer 3b shown in FIG. 1. In other words, in the NOx storage catalyst layer 3 of the NSR catalyst 1 shown in FIG. 6, too, the upstream side catalyst layer 3a does not contain potassium (K) as an NOx storage material, but the downstream side catalyst layer 3b alone contains potassium (K) as an NOx storage material.

Even in the case where such a construction as shown in this FIG. 6 is adopted, the overall exhaust gas purification function of the NSR catalyst 1 based on the NOx reduction function and the HC oxidation function can be improved to a further extent, in comparison with the case where the NOx storage catalyst layer is formed in such a manner that K is distributed over the entire region of the NOx storage catalyst layer from its upstream end to its downstream end.

What is claimed is:

1. An NOx storage reduction catalyst which is arranged in an exhaust passage of an internal combustion engine, said catalyst comprising:

a carrier; and an NOx storage catalyst layer supported by said carrier, and formed including a plurality of kinds of NOx storage materials, which are catalyst components having a function to store nitrogen oxides (NOx), and noble metals;

wherein said NOx storage catalyst layer has a laminated structure comprised of a lower layer which is in contact with said carrier, and an upper layer which is formed on said lower layer; and said lower layer of said NOx storage catalyst layer contains rhodium (Rh) as a noble metal, but said upper layer of said NOx storage catalyst layer does not contain rhodium (Rh) as a noble metal;

wherein a portion of said NOx storage catalyst layer extending from its upstream end to an X % ($0<X\leq75$) of the overall length of said NOx storage catalyst layer along the flow of exhaust gas forms an upstream side catalyst layer;

a portion of said NOx storage catalyst layer at a downward side of said upstream side catalyst layer along the flow of exhaust gas forms a downstream side catalyst layer; and said upstream side catalyst layer does not contain potassium (K) as an NOx storage material, but said downstream side catalyst layer contains potassium (K) as an NOx storage material.

* * * * *

UNITED STATES PATENT AND TRADEMARK OFFICE
CERTIFICATE OF CORRECTION

| | |
|---|---|
| PATENT NO. | : 10,634,026 B2 |
| APPLICATION NO. | : 15/427361 |
| DATED | : April 28, 2020 |
| INVENTOR(S) | : Nobusuke Kabashima |

Page 1 of 1

It is certified that error appears in the above-identified patent and that said Letters Patent is hereby corrected as shown below:

On the Title Page

Item (54) and In the Specification, Column 1, Line 1, "NOX" should read: --NOx--

Signed and Sealed this
Twenty-fifth Day of August, 2020

Andrei Iancu
*Director of the United States Patent and Trademark Office*